United States Patent [19]

Mori et al.

[11] 4,334,920
[45] Jun. 15, 1982

[54] INTEGRATED PROCESS FOR THERMAL CRACKING OF HEAVY OIL AND REDUCTION OF IRON ORES

[75] Inventors: Kenji Mori, Nishinomiya; Eiji Miura, Mitaka; Reijiro Nishida, Matsudo; Kiyohiko Koizumi, Tokyo, all of Japan

[73] Assignees: Kobe Steel, Ltd.; Koa Oil Co., Ltd., both of Japan

[21] Appl. No.: 138,427

[22] Filed: Apr. 8, 1980

[30] Foreign Application Priority Data

Apr. 11, 1979 [JP] Japan .................................. 54/43804

[51] Int. Cl.³ ................................................ C22B 1/10
[52] U.S. Cl. ............................................ 75/26; 75/29; 208/124
[58] Field of Search .................................. 75/26, 29, 4

[56] References Cited

U.S. PATENT DOCUMENTS

2,760,855  8/1956  Barking ................................... 75/29
2,988,442  6/1961  Tanner .................................... 75/34
3,264,209  8/1966  Files ...................................... 208/124

Primary Examiner—P. D. Rosenberg
Attorney, Agent, or Firm—Wenderoth, Lind & Ponack

[57] ABSTRACT

Vacuum distillation residue oil having a Conradson carbon value of 5 to 40% and a specific gravity of 0.9 to 1.10 is thermally cracked in the presence of iron ore particles in fluidized state in a thermal cracking reactor thereby to produce light oils and cracked gases and to form by-product carbon, which is caused to deposit on the iron ore particles, which are then transferred to and heated at 800° C. to 1200° C. in a reducing furnace to be reduced in a solid state reaction, into sponge iron. Thus, heavy oil is thermally cracked and sponge iron is produced by an economical, integrated process.

7 Claims, 1 Drawing Figure

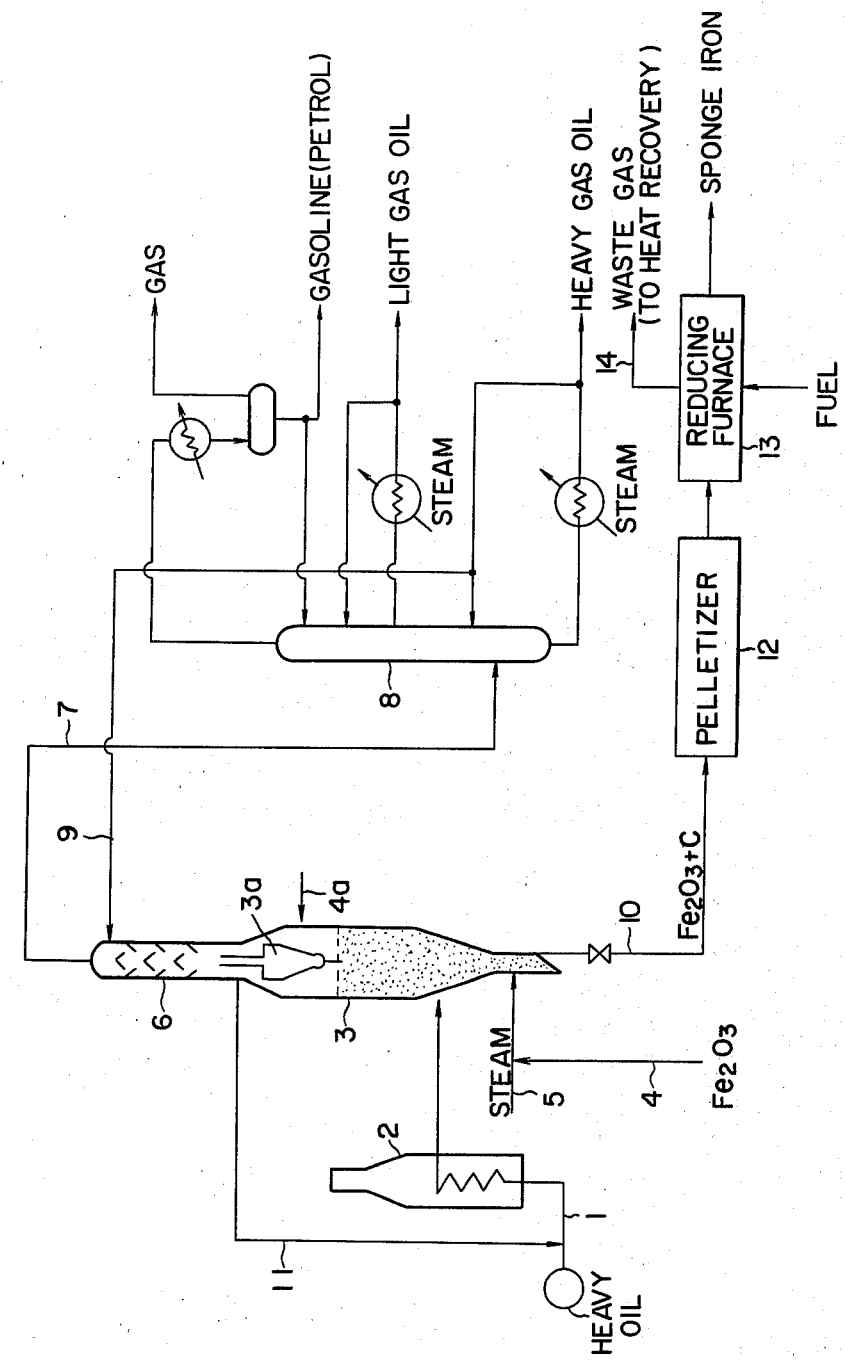

INTEGRATED PROCESS FOR THERMAL CRACKING OF HEAVY OIL AND REDUCTION OF IRON ORES

BACKGROUND OF THE INVENTION

This invention relates, firstly, to a process for reducing iron ores and more particularly to a process for producing reduced or sponge iron by reducing iron ore with carbon which has been produced as a by-product of thermal cracking of heavy oil as a reducing agent.

As is known, the blast furnace-converter process is being widely utilized at present as a process for producing steel. This blast furnace-converter process is generally considered to be a substantially perfected technique, but this does not mean that it is not accompanied by any problems. More specifically, in this blast furnace-converter process, in order to produce iron by removing oxygen (reducing) from iron ore (iron oxide), pig iron containing an excess of carbon is once obtained in the blast furnace and then, in the converter, the excess carbon, together with the accompanying silicon, phosphorous, etc., is oxidized and removed thereby to produce steel. Because of this procedure, the efficiency is poor in theory. Moreover, there is a problem in that strongly caking coal used as a coke raw material for blast furnaces is becoming scarce throughout the world.

Another process which comprises carrying out reduction of iron ore in the solid state while it is in contact with a reducing agent, in general, to a reduction degree of 85 percent or more thereby to obtain sponge iron, and melting and refining this sponge iron in an electric furnace thereby to produce steel has been developed. This process does not entail the theoretically wasteful combination of superfluous reduction followed by oxidation of excessive carbon and the accompanying silicon, phosphorous, etc., which is required in the above described blast furnace-converter process. Another advantageous feature is that strongly caking coal, which is a coke raw material for blast furnaces, is not required.

Furthermore, a technique wherein the thus reduced iron ore pellets of reduction degree of 70 to 90 percent are used as starting materials for blast furnaces in order to effect a saving in the consumption of fuel coke and to improve productivity is being industrially tested.

The reason why the use of these solid state or direct reduction processes do not become widespread throughout the world is that the regions where the reducing agents and the raw materials thereof used in the production of sponge iron, that is, coals, brown coal, natural gases, as well as sources of carbon, $H_2$, and CO gas, etc., are unevenly distributed throughout the world, and regions where such processes become economically advantageous are limited.

The processes for producing sponge iron are classified by (a) the type of reducing furnace used into the rotary-kiln process, the shaft furnace process, the fixed-bed furnace process, and the fluidized-bed furnace process and by (b) the kind of reducing agent into the solid reducing agent process and the gaseous reducing agent process. In general, the rotary-kiln process is used with the solid reducing agent process, while the remaining three processes divided by type of furnace are used with the gaseous reducing agent process.

Leaving aside, for the moment, the production of sponge iron, the background of the second aspect of this invention will be considered. In view of the limited reserves of petroleum resources, the conversion of relatively heavy fractions in the petroleum fractions into light fractions thereby to increase their commercial value is an important problem. For this purpose, the fluidized catalytic cracking process (FCC process) wherein heavy oil is subjected to catalytic thermal cracking in the presence of catalyst particles such as silica or alumina in a fluidized state has been used from the past.

In this FCC process, however, carbon (coke) produced as a by-product in the thermal cracking of a heavy oil is deposited on the catalyst particles and lowers their activity. For this reason, frequent regeneration of the catalyst is necessary. Furthermore, another difficulty is that this process is applicable to only distillate oils such as ordinary gas oil and high-quality residue oils of limited kinds.

The fluid coking process of recovering as a product the by-product coke in the above described thermal cracking of heavy oil is also widely practiced. In this process, heavy oil is thermally cracked with the use of fine coke in fluid state as a heat and fluid medium. Because the fine coke is used, not as a catalyst, but merely as a heat and fluid medium, there is no problem of loss in activity even when the by-product coke is deposited. Accordingly, this process has the advantage of ease of processing the heavy oil and is generally used for the preparation of the feed oil of the FCC method.

The coke produced as a by-product in the fluid coking process is taken out of the reactor, and a portion thereof is burned to provide heat for heating fine coke which is recirculated into the reactor. At the same time, the remainder of the coke is taken out as a product. In contrast with the delayed coking process which is comparable as a method of processing heavy oil, this fluid coking process is a fully continuous process. While this process has a number of advantages such as high yield of cracked products, the quality of the product coke is so poor that it cannot be used except as a fuel.

SUMMARY OF THE INVENTION

It is an object of this invention to provide, in the aforedescribed production of sponge iron, a process wherein the carbon used as a reducing agent can be supplied in coexisting state which is convenient for the reduction of the raw-material iron ore.

Another object of this invention is to provide a process in which it is possible to effectively utilize the carbon (coke) produced as a by-product in the fluidized catalytic or thermal cracking of heavy oil of the FCC process, the fluid coking process, or the like.

As a result of our study, we have discovered that the problems accompanying the aforedescribed processes for producing sponge iron and the process of fluid thermal cracking of heavy oil can be solved by using iron ore particles instead of particles of silica and alumina catalyst in the fluidized thermal cracking of heavy oil. More specifically, the integrated process for thermal cracking of heavy oil and reduction of iron ores of this invention comprises: thermal cracking heavy oil in the presence of iron ore particles in a fluidized state in a thermal cracking reaction vessel thereby to produce light oils and cracked gases; at the same time causing by-product carbon thus formed to deposit on the iron ore particles; transferring the iron ore particles with the carbon deposited thereon thus obtained from the thermal cracking reaction vessel to a reducing furnace; and heating the iron ore particles thereby to reduce the iron ore in the reducing furnace.

The nature, utility, and advantageous features of this invention will be apparent from the following detailed description, beginning with a consideration of broad aspects of the invention and concluding with specific examples of practice, when read in conjunction with the accompanying drawing briefly described below.

BRIEF DESCRIPTION OF THE DRAWING

In the drawing, the single FIGURE is a flow chart of one example of an apparatus for practicing the invention.

DETAILED DESCRIPTION OF THE INVENTION

First, some of the advantageous features of the process of the invention will be generally discussed in some greater detail with respect to the thermal cracking and reduction steps.

THERMAL CRACKING STEP

The thermal cracking step of the process of the invention will first be compared with the fluid coking process.

In the fluid coking process, the carbon formed by the thermal cracking has no applicability except as a fuel. In contrast, in the process of this invention, this carbon formed in the thermal cracking step is effectively utilized as a reducing agent for iron ore in the subsequent reducing step. Furthermore, the coke in powder state in the fluid coking process is inactive with respect to the thermal cracking reaction, whereas the iron ore used in the process of this invention, depending on its kind, can be expected to produce distilled oils of better quality than by a mere thermal cracking as a result of its catalytic action although not so effective as silica or alumina catalyst in the FCC process. For example, examples of utilization of iron ore as a catalyst for catalytic cracking of petroleum fractions are disclosed in references such as E. I. Kazakov, Khim i Tekhnol, Smol term Pererabotki Tverd. Topliv, Akad. Nauk SSSR, Inst Goryuch, skop 1965, 86–98 and V. V. Patrikeev, et al, Zh. Prikl Khim. 38(1) 148–153.

The thermal cracking step will then be compared with the FCC process.

In the FCC process, the deterioration of the catalyst due to heavy metals in the feed oil and by-product carbon becomes a problem. In contrast, the iron ore particles in the process of this invention are continuously drawn out and used as a raw material of the reduction step, whereby there is no necessity of recirculation of the iron ore particles to the cracking reactor for maintaining activity. (However, recirculation of the iron ore particles is possible for the purpose of utilization thereof as a heat source, depending on the necessity.) Since restriction of the production of carbon as a by-product is not essentially necessary in the thermal cracking step, residual oil from vacuum distillation of poor quality as used in the fluid coking process can be used as a feed oil.

It will be obvious that, in the thermal cracking step, the iron ore particles, similarly as the fine coke in the fluid coking process or the catalyst particles in the FCC process, function also as a medium for taking the formed carbon out of the cracking reactor and preventing clogging of the reactor.

REDUCTION PROCESS

The greatest advantage of the step of reducing iron ore according to this invention in comparison with known sponge iron production processes is that, since, in the preceding cracking step, the iron ore which is the material to be reduced is uniformly covered with deposited carbon enveloping each ore particle which state is extremely convenient for the reducing reaction, a special mixing or kneading apparatus is not necessary prior to the reducing step.

More specifically, the overall reducing reaction of the iron ore due to solid carbon is, in general, expressed as follows with respect to hematite.

$$2Fe_2O_3 + 3C = 4Fe + 3CO_2 \tag{1}$$

Actually, however, when the temperature rises above 750° C. at which the reaction of the Formula (4) given hereinafter becomes vigorous, the reactions of the following Formulas (2), (3), and (4) progress simultaneously.

$$Fe_2O_3 + CO = 2FeO + CO_2 \tag{2}$$

$$FeO + CO = 2Fe + CO_2 \tag{3}$$

$$CO_2 + C = 2CO \tag{4}$$

When the progress of the reducing reaction is considered, it is understandable that the closer the place where the reactions of Formulas (2) and (3) occur (boundary surface between the ore cores yet to be reduced and the reduced iron shells in the iron ore particles) and the place where the reaction of the Formula (4) occurs (surfaces of the carbon particles) are, the easier it is for the $CO_2$ generated according to Formulas (2) and (3) to migrate to the surfaces of the carbon particles formed by the Boudouard's reaction of Formula (4), and the reduction rate which is the overall result of the reactions (2), (3), and (4) becomes high. In the case where the place where the reactions of the Formulas (2) and (3) occur and the place where the reaction of the Formula (4) occurs are close together in this manner, there is a characteristic advantage in that there is no substantial retardation of the reducing rate especially in the latter period (for example, reduction rate of 80 percent or more) of the reduction in which the sintering between the formed reduced iron particles progresses, and the diffusion rate of the $CO_2$ formed determines the rate of the reducing reaction.

In this regard, in the cracking step of this invention, fine particles of carbon chemically deposit through thermal cracking of the heavy oil on the surface of the iron ore in the state of fine particles of a degree whereby fluidization is possible. For this reason, a microscopically uniform starting-material complex of the iron ore and the reducing agent is obtained in a state wherein the centers of the iron ore particles and the carbon surface are extremely close together, that is, in an ideal state for the progress of the reducing reaction.

Furthermore, the quantity of the reducing agent necessary for the reduction of iron ore to metallic iron is, in general, from 10 to 15 percent. However, even in the case where this quantitative percentage is changed in order to increase the efficiency of the cracking process step, the percentage can be easily controlled to an appropriate value by adding and mixing additional reducing agent or iron ore. Mixing can be easily accomplished, of course.

Furthermore, anthracite, coke, bituminous coal, and the like ordinarily used as solid reducing agent have an ash content of 5 percent or more, but the carbon produced as by-product by the thermal cracking of heavy oil has a lower ash content. For this reason, while post-treatment such as the separation of the sponge iron and the ash content of the reducing agent is required in general, but in this invention there is no necessity of separating the ash content from the sponge iron after reduction. Furthermore, when the ash content is low, in the case where a rotary kiln is used for the sponge iron producing apparatus, the formation of kiln ring caused by the formation of firelite is almost negligible, and the operation is facilitated. Another advantage is that the difficulty of forming a fluidized bed because of the occurrence of agglomeration due to firelite formation in the case where fluidized bed reduction is carried out, also, can be avoided.

The reduction step of this invention may be classified as a solid state process in view of the kind of reducing agent. However, it differs from an ordinary solid reducing agent process in that the iron ore particles which are of the material to be reduced and the reducing agent carbon are supplied in a uniformly mixed state even microscopicly. For this reason, for the reducing furnace, a shaft furnace, a fixed bed furnace, or a fluidized bed furnace can be used, provided that a suitable heating medium is selected, as an alternative furnace in place of a rotary kiln which is ordinarily used.

Further, since the sponge iron produced by the instant process contains a suitable quantity of residual carbon, it has the advantage of being easily melted.

By the way, the method of reducing iron ore in a fluidized bed reducing furnace with petroleum as a reducing agent is known. (Example references are: Japanese Patent Application Nos. 30361/1977 and 30362/1977; and G. Tomasicchio Proc. Int. Symp. on Fluidization, Netherlands Univ. Press 1967.) In the case of reduction of iron ore in a fluidized bed reducing furnace in this manner, a reducing temperature of at least 650° C. is necessary, and, in addition, most of the petroleum is consumed as a reducing agent. For this reason, even if the heavy oil can be gasified, it cannot be expected that light oils can be obtained as products. Furthermore, the reason why reduction of iron ore cannot be carried out adequately at a low temperature is as set forth in these references.

An important characteristic of this invention is that the cracking of the heavy oil in the fluidized bed and the reduction of the iron ore with the coke obtained from the cracking are clearly divided, and the two objects of obtaining ample light oil and, at the same time, obtaining sponge iron are reasonably achieved.

Thus, by the practice of the process of this invention, heavy oil and iron ore can be processed in large quantity in a consistent, integrated manner, and valuable light oil fractions and/or cracked gases and sponge iron can be advantageously produced with high efficiency without accompanying formation of by-products of low commercial value in intermediate stages. Moreover, the thermal cracking step and the reduction step in the process of this invention have a relatively high independence therebetween in operational control procedure in spite of such a consistency therebetween. Accordingly, for the heavy oil and the iron ore, which are the principal raw materials in these process steps, those of a wide range of properties can be readily processed. Furthermore, it is possible to use a wide range of operational conditions.

A specific example of practice, constituting a preferred embodiment of this invention and modifications thereof will now be described in detail with reference to the accompanying drawing. Throughout the following description, all quantities given in "percent" or "part(s)" are by weight.

THERMAL CRACKING STEP

Referring to the flowchart in the drawing, a vacuum distillation residue oil having the properties of a Conradson carbon of 5 to 40 percent and a specific gravity of 0.9 to 1.10 is introduced into the apparatus illustrated through a pipe line 1 and, after being preheated to a temperature of 400° C. or lower in a preheating furnace 2, is supplied to a cracking reactor 3 of the shape of an elongated vertical cylinder provided at its upper part with a cyclone 3a and a scrubber 6. Depending on the necessity, it is also possible to use a tube type cracking furnace capable of heating the feed oil to a temperature of 500° C. or lower instead of the preheating furnace 2.

Iron ore is introduced together with steam through a pipe line 4 into the lower part of the reactor 3 or is introduced through a pipe line 4a into substantially the upper middle part of the reactor. In this case, for example, hematite of an average particle size of 10 to 200 microns in diameter may be mixed with the vacuum distillation residue oil to form a slurry to be introduced into the reactor 3. For the purpose of fluidizing the iron ore, steam is introduced into the reactor 3 through a pipe line 5 in a manner such that a flow speed within the reactor 3 of 0.03 to 1 meter/sec. will be obtained.

The iron ore particles and the steam are introduced into the cracking reactor 3 as their flow rates and temperatures are so controlled as to form a fluidized bed of a temperature of 400° to 630° C. within the reactor. In the practice of this invention, it is also possible, of course, to raise the thermal cracking temperature above 630° C. thereby to partially reduce the iron ore at this stage. However, since it is disadvantageous, in general, from the viewpoint of heat economy to raise the thermal cracking temperature in this manner, it is preferable to use a temperature in the above stated range.

For supplying heat into the cracking reactor 3, there are alternative methods such as, for example, the method wherein superheated steam heated from a separate heat source is used as the steam to be supplied through the pipe line 5 and the method wherein iron ore particles heated by a separate heat source are supplied.

The superficial velocity (W/H/W=(residual oil feed (t/hr))/(iron ore hold-up (t) of reactor)) within the reactor is, in general, 30 l/hr or lower, and the pressure within the reactor is 2 kg/cm$^2$G or lower.

Approximately 70 to 90 percent of the vacuum distillation residue oil, for example, is cracked to be lighter products as a result of the reaction in the cracking reactor 3. From these products, iron ore and carbon powder formed are removed by a cyclone 3a, and the remainder products are sent through a scrubber 6 and a pipe line 7 to a refinery system, including a rectifier or fractionator 8, in which they are fractionated into cracked gas, gasoline (petrol), light gas oil, heavy gas oil, and other products.

A portion of the heavy gas oil thus produced is recirculated through a pipe line 9 to the scrubber 6 in the upper part of the cracking reactor 3, where it captures iron ore particles and fine powder of the formed carbon and, further, imparts a refluxing effect with respect to the cracking product oils, thereafter being returned to the cracking reactor 3.

On the other hand, approximately 10 to 30 percent, for example, of the vacuum distillation residue oil becomes a by-product carbon, which, being deposited on the iron ore particles, is taken out together therewith through the bottom of the cracking reactor 3 and through a pipe line 10. In this operation, procedures such as stripping of accompanying oil contents by steam supplied through the pipe line 5 or some other auxiliary pipe line are suitably carried out by ordinary methods. In the preheating of the feed oil in the preheater 2, measures such as returning a portion of the cracked oil from the cracking reactor 3 through a pipe line 11 and mixing with the feed oil thereby to prevent clogging due to coking in the preheater 2 are carried out in accordance with the necessity.

REDUCTION STEP

By increasing or decreasing, for example, the quantity of iron ore particles supplied relative to the vacuum distillation residue oil in the above described step of cracking heavy oil, the carbon in an amount required for the reduction of iron oxide in the iron ore particles are caused to deposit on the iron ore particles.

The iron ore particles on which the carbon is deposited is formed in pellets or briquettes each of a diameter of the order of 0.6 to 5 mm. by means of a pelletizer 12 or a briquetting machine. At this stage, it is possible, if necessary, to supplementarily add in suitable quantities reducing agent prepared by separately pulverizing solid carbon such as anthracite or coke thereby to adjust the composition of the reaction blend. The composite materials of iron ore and carbon thus formed are charged into a rotary kiln 13, constituting a reducing furnace, and are heated to a temperature of 800° to 1,200° C. by combustion gas thereby to produce sponge iron. The iron grade of this sponge iron is of the order of 85 to 95 percent. On the other hand, the waste gas from the kiln 13 is sent through a duct 14 to a heat recovery system.

By the above described mode of practice, for example, 237 parts of a vacuum distillation residue oil (of a specific gravity of 0.92 and a carbon residue of 8.5 percent) of Taching crude oil and 137 parts of hematite of 66-percent iron content and an average particle size of 150 mesh (Riodoce, Produce of Brazil) are introduced into a cracking reactor along with 21.8 parts of steam and subjected together to thermal cracking at a temperature of 530° C. and superficial velocity of 3 ton/hr/ton, whereby 22 parts of a hydrocarbon gas lighter than butane, 40 percent of cracked naphtha, and 162 parts of cracked gas oil are obtained. At the same time, 18.8 parts of carbon is deposited on the hematite particles. The hematite particles with carbon deposited thereon are mixed with 37.5 parts of powdered petroleum coke and formed into pellets of the size of 36×19.8×4.8 mm. The composite pellets thus formed are introduced into a rotary kiln and subjected to reduction at a temperature of 1170° C. for 1 hour, whereby 100 parts of sponge iron of an iron content of approximately 92 percent is obtained.

The foregoing description concerns principally one example of a representative mode of practice of the process of producing sponge iron according to this invention. However, as mentioned hereinbefore, the process of this invention comprises steps which have relative independency and, moreover, have flexibility with respect to operational control and raw materials. For this reason, modifications other than those described above are possible, as illustrated below.

CRACKING STEP

For the heavy oil, in addition to the vacuum distillation residue oil of the above description, any of the feed oils used in the fluid coking process and the FCC process, such as solvent deasphalting extraction residue oil, thermal cracking residue oil, catalytic cracking residue oil, heavy gas oil, vacuum distillation gas oil, and coker gas oil can be used.

For the iron ore, iron oxide ores such as the aforementioned hematite, magnetite, or mixtures thereof are used. Examples of other iron ores which can be used are limonite and siderite.

REDUCTION STEP

As mentioned hereinbefore, the reduction step according to this invention can be carried out in a shaft furnace, a fixed bed furnace, or a fluidized bed furnace in addition to a rotary kiln. In the case where a furnace other than a fluidized bed furnace is used, it is desirable that the iron ore particles with carbon from the cracking step deposited thereon be enlarged in size into bodies such as pellets or briquettes, similarly as in the case where a rotary kiln is used. In the case where a fluidized bed furnace is used, of course, it is unnecessary to form such enlarged bodies.

According to this invention as described above, iron ore particles on which by-product carbon obtained in the thermal cracking of heavy oil is deposited are used directly, or after being merely subjected to a simple pretreatment, as a starting material for the production of sponge iron, whereby useful light oil fractions, cracked gases, and sponge iron can be produced with high efficiency in an integrated manner with substantially no production as by-products of intermediate products of low commercial value. This is the most important advantage of this invention.

What we claim is:
1. An integrated process for thermal cracking of hydrocarbon oil and production of iron which consists essentially of:
   (a) thermally cracking the hydrocarbon oil in the presence of iron ore particles of a particle size suitable for fluidization in a fluidized state in a thermal cracking reactor at a temperature of from 400° C. to 630° C. thereby to produce and recover light oils and cracked gases; at the same time causing by-product carbon thus formed to deposit on the iron ore particles; said hydrocarbon oil being a vacuum distillation residue oil having a Conradson carbon value of 5 to 40 percent and a specific gravity of 0.9 to 1.10 and,
   (b) introducing said carbon-deposited iron ore with or without additional carbon, into a reducing furnace and heating the thus introduced mixture of the carbon deposited iron ore with or without the additional carbon at a temperature of from 800° C. to 1,200° C. in the reducing furnace, while maintaining said mixture in the solid state, to thereby produce sponge iron.
2. The integrated process according to claim 1 wherein the amount of carbon deposited in step (a) is between about from 10% to 15% of the carbon deposited ore.

3. The integrated process according to claim 1 wherein additional carbon is added in step (b).

4. The integrated process according to claim 1 in which the iron ore is an ore selected from the group consisting of hematite, magnetite, limonite, siderite, and mixtures of at least two thereof.

5. The integrated process according to claim 1 in which the thermal cracking reactor has the shape of an elongated vertical cylinder provided at its upper part with a cyclone and a scrubber, and the reducing furnace is a rotary kiln.

6. The integrated process according to of claim 1 in which the iron ore particles with the carbon deposited thereon are enlarged in size prior to being introduced into the reducing furnace.

7. The integrated process according to of claim 1 in which the steam is injected into the cracking reactor thereby to fluidize the iron ore particles.

* * * * *